United States Patent [19]

Smith

[11] 4,435,612
[45] Mar. 6, 1984

[54] CABLE SPLICE HOUSING

[75] Inventor: Donald J. Smith, Woodland Hills, Calif.

[73] Assignee: Communication Technology Corporation, Los Angeles, Calif.

[21] Appl. No.: 356,374

[22] Filed: Mar. 9, 1982

[51] Int. Cl.³ .......................................... H02G 15/113
[52] U.S. Cl. ......................................... 174/92; 174/76
[58] Field of Search ........................ 174/76, 92, 138 F

[56] References Cited

U.S. PATENT DOCUMENTS

| | | | |
|---|---|---|---|
| 3,138,657 | 6/1964 | Wengen | 174/92 |
| 3,147,338 | 9/1964 | Ekvall et al. | 174/138 |
| 3,325,591 | 6/1967 | Wahl | 174/138 |
| 3,399,374 | 8/1968 | Pauza et al. | 174/138 F |
| 3,683,314 | 8/1972 | Elkins | 174/92 X |
| 3,757,031 | 9/1973 | Izraeli | 174/138 F |
| 3,937,870 | 2/1976 | Bumpstead et al. | 174/87 |
| 3,992,569 | 11/1976 | Hankins et al. | 174/92 |
| 4,018,983 | 4/1977 | Pedlow | 174/135 |
| 4,029,896 | 6/1977 | Skinner | 174/138 F |
| 4,337,374 | 6/1982 | Smith | 174/138 F |

*Primary Examiner*—Richard L. Moses
*Assistant Examiner*—Morris H. Nimmo
*Attorney, Agent, or Firm*—Harris, Kern, Wallen & Tinsley

[57] ABSTRACT

A housing for an electrical cable splice for handling two or more cables in end-to-end and/or side-by-side arrangement. First and second shells with central sections and opposed end sections, with one shell sliding over the other to form a main compartment for the splices and a sealant or encapsulating material. The end sections of one shell are provided with channels for receiving cables, with a groove in the wall of each channel. The other shell includes means sliding in the channels for defining entrance passages for the cable, and projecting tabs which slide in the grooves and close the entrance passages. The projecting tabs are selectively broken away as determined by the number and location of cables, to provide open entrance passages.

7 Claims, 4 Drawing Figures

CABLE SPLICE HOUSING

BACKGROUND OF THE INVENTION

This invention relates to housings for splices in electrical cables, including telephone cables, and in particular, to a new and improved housing suitable for handling two or more cables and protecting the splice from moisture and mechanical damage.

Electrical cables such as telephone cables and power cables are interconnected by joining or splicing the individual conductors of the two cables. The integrity of the cable is breached at the ends exposing the conductors for the splices and it is desirable to provide some type of electrical insulation and mechanical protection for the splices and the cable ends.

One such housing in widespread use today is shown in U.S. Pat. Nos. 3,934,076 and 4,053,704. Another form of enclosure is shown in U.S. Pat. No. 4,337,374.

In these prior art devices, cables are spliced in side-by-side configuration and inserted into a one piece or two piece housing which is charged with grease or other encapsulating material.

Another style of housing for cable splices utilizes a central cylindrical sleeve with tapered end sections either formed with the sleeve or separately, with the splice positioned within the sleeve and with the sleeve being filled by the encapsulating material after the housing has been closed. Some forms of this type of housing are shown in U.S. Pat. Nos. 3,836,694; 3,895,180; and 3,992,569.

A housing for enclosing the splices of three cables is shown in U.S. Pat. No. 4,176,245, and housings for enclosing the splices of four cables are shown in U.S. Pat. Nos. 3,147,338; 3,325,591; and 4,029,896.

These prior art housings provide for enclosing the splice or splices of a predetermined number of cables. Also, a number of them provide for handling cables of a particular size. While the housing may do a satisfactory job for electrically insulating and mechanically protecting the splice, it does require manufacturing and maintaining a stock of housing components of various sizes for use with the various types of splices encountered in the field.

Accordingly, it is an object of the present invention to provide a new and improved cable splice housing which can be utilized with one to four cables and which will provide the desired electrical and mechanical protection for the resulting splice or splices. A further object is to provide such a housing which can be utilized with cables of various sizes.

It is a particular object of the invention to provide such a housing which will provide sealing for the encapsulating material when used with various numbers of cables, and one which is readily adapted by the worker in the field for use with a specific number of cables and with cables having specific positions.

Other objects, advantages, features and results will more fully appear in the course of the following description.

SUMMARY OF THE INVENTION

A housing for an electrical cable splice with first and second generally rectangular shells with one sliding over the other. Each shell has a central section and opposed end sections. Each of the end sections of one shell has a wall defining one or more channels leading to the central section of the shell, with a groove in the wall. The end sections of the other shell have channel closure means for sliding in the channels, and projecting tabs for sliding in the grooves. When the shells are brought together, the channel closure means slide part way into the channels to form entrance passages, and the tabs slide in the grooves to close the entrance passages. The tabs are selectively breakable to provide open entrance passages.

In the preferred embodiment, one of the shells has an opening for pouring a sealing material into the central sections after the shells are brought together, and a cover for closing this opening. The shells have interengaging projections and openings for locking the shells together, and one shell has elongate parallel ribs which function with the central section shell wall to define slots or grooves receiving the central section of the other shell providing both mechanical stiffness and fluid sealing.

DESCRIPTION OF THE PREFERRED EMBODIMENT

Figure 1:
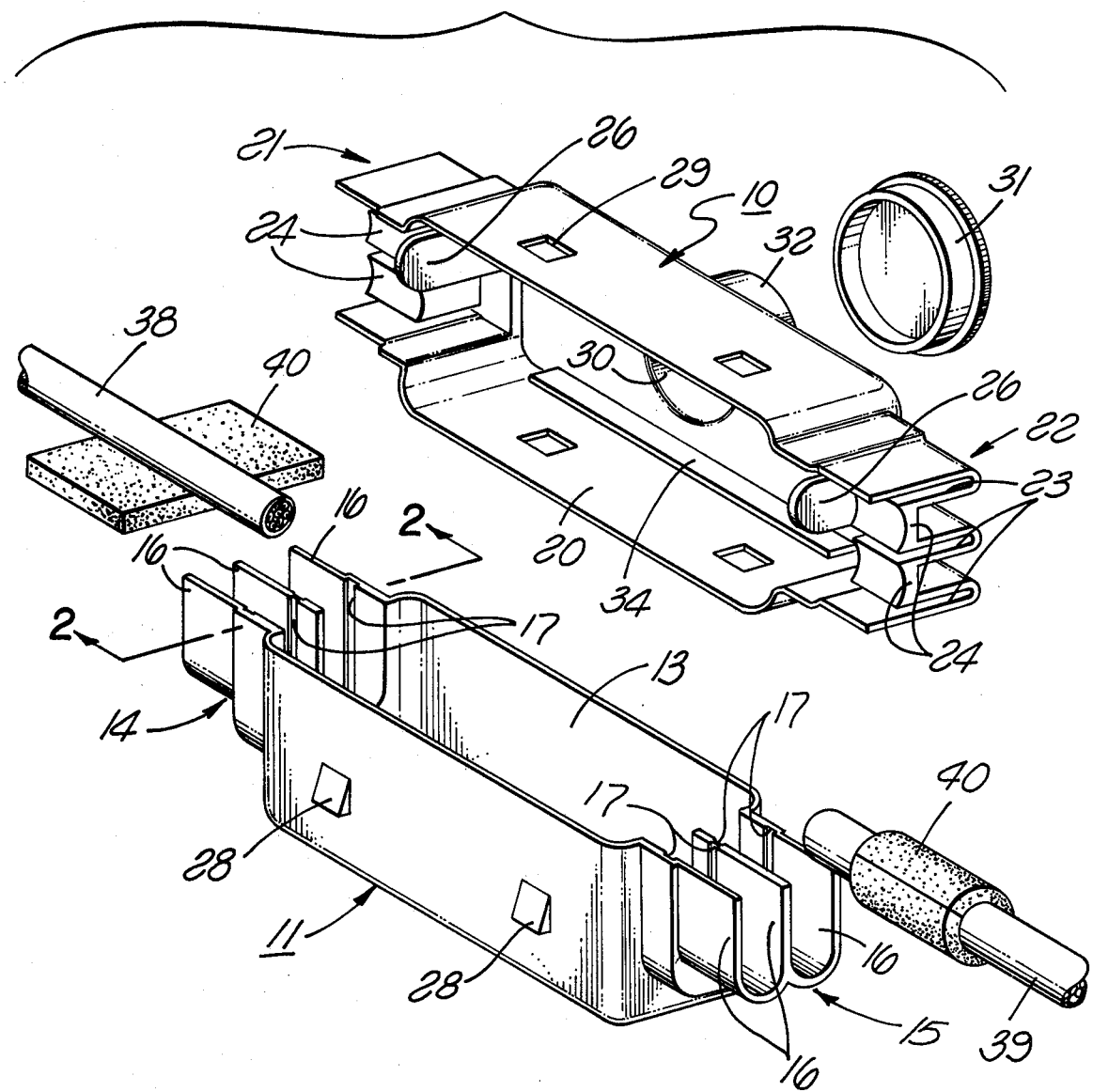
FIG. 1 is an exploded isometric view showing the two shells of a cable splice housing and incorporating the preferred embodiment of the invention.
Figure 2:
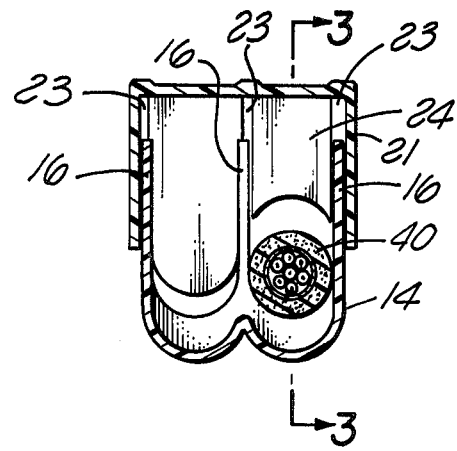
FIG. 2 is a sectional view taken along the line 2—2 of FIG. 1, showing the housing in the partially closed position.

The cable splice housing includes an upper shell 10 and a lower shell 11, both generally rectangular in configuration and typically both being plastic moldings. The lower shell 11 has a central section 13 and opposed end sections 14, 15. Each of the end sections 14, 15 has three parallel walls 16 which define channels therebetween. Grooves 17 are provided in the walls 16.

The upper shell 10 has a central section 20 and opposed end sections 21, 22. Slots 23 are provided in each of the end sections 21, 22 for slidingly receiving the walls 16 of the end sections of the shell 11. Channel closure means 24 are carried between the slots 23 for sliding in the channels between the walls 16. The shell 10 as originally manufactured also includes four tabs 26 positioned for sliding in the grooves 17 when the upper shell 10 is pushed down over the lower shell 11.

Figure 4:
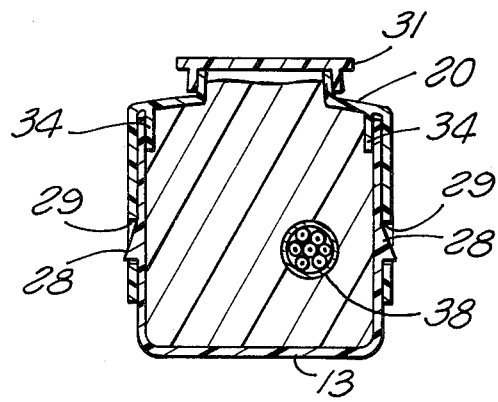
FIG. 4 is a sectional view taken along the line 4—4 of FIG. 3.

Interengaging elements are provided on the two shells for holding the shells together. In the embodiment illustrated, wedge-shaped bosses 28 are provided on the outer side of the central section 13 of the shell 11, and corresponding openings 29 are provided in the side walls of the central section 20 of the shell 10. An opening 30 is provided in one of the shells, in the embodiment illustrated, the shell 10, and a cap 31 slides on the rim 32 about the opening 30 to close the opening. Ribs 34 are provided in the central section 20 of the shell 10, with each rib spaced inward from the corresponding side wall of the shell thereby defining slots for slidingly receiving the side walls of the shell 11, as best seen in FIG. 4. The ribs and slots provide for sealing engagement between the two shells, and for stiffening of the upper shell. Other ribs 36 may be provided in the lower shell for stiffening purposes.

The housing shown in the drawings may be utilized for terminating any number of cables up to four. Of course, provision for terminating additional cables could be achieved by building the shells with more than two entrance openings in each end section. In the embodiment illustrated, two cables 38, 39 are being interconnected and enclosed within the housing.

Figure 3:
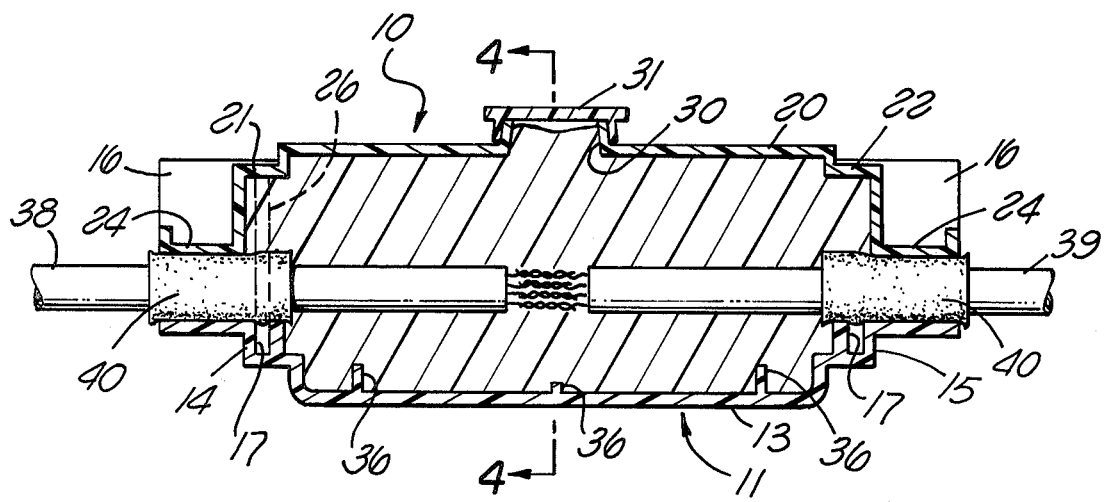
FIG. 3 is a sectional view taken along the line 3—3 of FIG. 2 showing the housing in the fully closed position.

Since the cables 38, 39 are being joined end-to-end, as shown in FIG. 3, two of the tabs 26 are broken off and two are left in place, as shown in FIG. 1. The individual conductors of the two cables are interconnected in the conventional manner, and then the cables are ready for laying in the channels of the lower shell. Each cable should be a snug fit in its respective channel. If the cable is not, the cable may be wrapped with a piece 40 of sponge rubber or the like in order to provide the snug fit in the channel.

Next the upper shell 10 is pushed down over the lower shell 11 to bring the bosses 28 into the openings 29. The tabs 26 of the upper shell slide in the grooves 17 of the lower shell closing the entrance passages wherever a tab is retained. The portions 24 of the end sections of the upper shell slide in the channels of the end sections of the lower shell and close the channels about the cables which are in position in the channels.

The housing is now ready for filing with a sealing compound. Typically a pourable urethane composition is poured into the main compartment formed by the central sections 13, 20, through the opening 30. The the opening is closed with the cover 31. The end closing of the splice is now complete.

The snug fit of the cables in the open entrance passages achieved by means of the sections 24 coming down on the cables in the channels, and the insertion of the tabs 26 in the grooves 17 of the channels which do not have cables provide for closing off the openings in the housing and prevent any substantial leakage of the encapsulating material. The encapsulating material usually is of the type which sets up or gels a short time after pouring so that there is no long term problem with leakage. The housing provides substantial mechanical protection for the splice and the encapsulating material provides substantial electrical protection and reduces the likelihood of moisture entering the splice area.

I claim:

1. A housing for an electrical cable splice, comprising:
   a first shell of generally rectangular cross-section having parallel sides and a bottom defining a first central section and opposed first end sections, with each of said first end sections having a wall defining at least one channel leading to said first central section and defining an open slot for receiving an electrical cable; and
   a second shell of generally rectangular cross-section having parallel sides and a bottom defining a second central section and opposed second end sections, with each of said second end sections having channel closure means for sliding in said channels;
   with the end sections of one of said shells having projecting tabs and with the end sections of the other of said shells having means defining abutments for said tabs;
   with one said shells sliding over the other of said shells with said parallel sides overlying each other bringing said central sections together to form an open main compartment defined by said overlying parallel sides, top and bottom, and
   with said channel closure means sliding part way in said channels to form entrance passages for electrical cable and with said tabs sliding in said end sections of said other shell against said abutments closing said entrance passages for blocking liquid flow from said main compartment,
   with said tabs selectively breakable to provide open entrance passages through said channels into said main compartment.

2. A housing as defined in claim 1 including means in one of said shells defining an opening into said main compartment for introducing encapsulating material, and a cover for closing said opening.

3. A housing as defined in claim 2 wherein said second shell includes elongate parallel ribs in said second central section and spaced from the walls thereof defining slots for receiving said first central section of said first shell.

4. A housing as defined in claim 3 with said shells having interengaging elements for holding said shells together.

5. A housing as defined in claim 4 wherein said interengaging elements include openings in the opposing walls of one shell and bosses in the opposing walls of the other shell and positioned for entering the openings when said shells are brought together.

6. A housing as defined in claim 1 wherein each of said first end sections includes three walls defining two parallel channels aligned with corresponding channels of the other end section, and
   each of said second end sections includes means defining three parallel slots for slidingly receiving corresponding walls of said first end sections.

7. A housing as defined in claim 1 wherein each of said means defining abutments comprises a U-shaped groove in the corresponding end section, with the corresponding tab of greater size than the channel and sliding in the groove.

* * * * *